United States Patent

DuPont et al.

[11] Patent Number: 5,327,816
[45] Date of Patent: Jul. 12, 1994

[54] FRUIT MILK SHAKE APPARATUS

[76] Inventors: Jacques DuPont, 532 Southside Ave., Freeport, N.Y. 11520; George Spector, 233 Broadway, Rm. 3815, New York, N.Y. 10007

[21] Appl. No.: 878,536

[22] Filed: May 5, 1992

[51] Int. Cl.⁵ .............................. B01F 7/16
[52] U.S. Cl. .................... 99/348; 366/343; 366/342; 366/281
[58] Field of Search .......... 99/348, 510, 287; 366/343, 251, 312, 245, 247, 249, 281; 241/169, 101.8

[56] References Cited

U.S. PATENT DOCUMENTS

| | | | |
|---|---|---|---|
| 2,484,391 | 10/1949 | Treiss, Jr. | 241/101.8 |
| 3,783,770 | 1/1974 | Aries | 99/348 |
| 3,810,605 | 5/1974 | Lambert | 99/348 |
| 3,933,315 | 1/1976 | Popeil | 241/169 |
| 4,149,455 | 4/1979 | Ross | 99/348 |
| 4,151,792 | 5/1979 | Nearhood | 99/348 |
| 4,175,875 | 11/1979 | Van Horbek | 366/343 |
| 4,193,702 | 3/1980 | Davis | 366/343 |
| 4,197,018 | 4/1980 | Groen, Jr. | 99/348 |
| 4,339,992 | 7/1982 | Kurland | 99/348 |
| 4,967,970 | 11/1990 | Michel | 241/169 |

*Primary Examiner*—Philip R. Coe
*Assistant Examiner*—Patrick F. Brinson

[57] ABSTRACT

A recipe for a bunky-shake is provided and consists of seven green plantains, one yellow banana and a list of other ingredients. Also provided is a process for making the bunky-shake, while an apparatus is for preparing all of the ingredients for the bunky-shake.

2 Claims, 1 Drawing Sheet

FRUIT MILK SHAKE APPARATUS

BACKGROUND OF THE INVENTION

The instant invention relates generally to fruit flavored beverages and more specifically it relates to a bunky-shake and preparation apparatus, which provides a recipe and mechanism for making the bunky-shake.

There are available various conventional fruit flavored beverages which do not provide the novel improvements of the invention herein disclosed.

SUMMARY OF THE INVENTION

A primary object of the present invention is to provide a bunky-shake and preparation apparatus that will overcome the shortcomings of the prior art devices.

Another object is to provide a bunky-shake and preparation apparatus that includes a recipe which utilizes plantains and a banana in its list of ingredients for making the bunky-shake.

An additional object is to provide a bunky-shake and preparation apparatus in which a mechanism is used in conjunction with a set of directions for preparing the bunky-shake.

A further object is to provide a bunky-shake and preparation apparatus that is simple and easy to use.

A still further object is to provide a bunky-shake and preparation apparatus that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
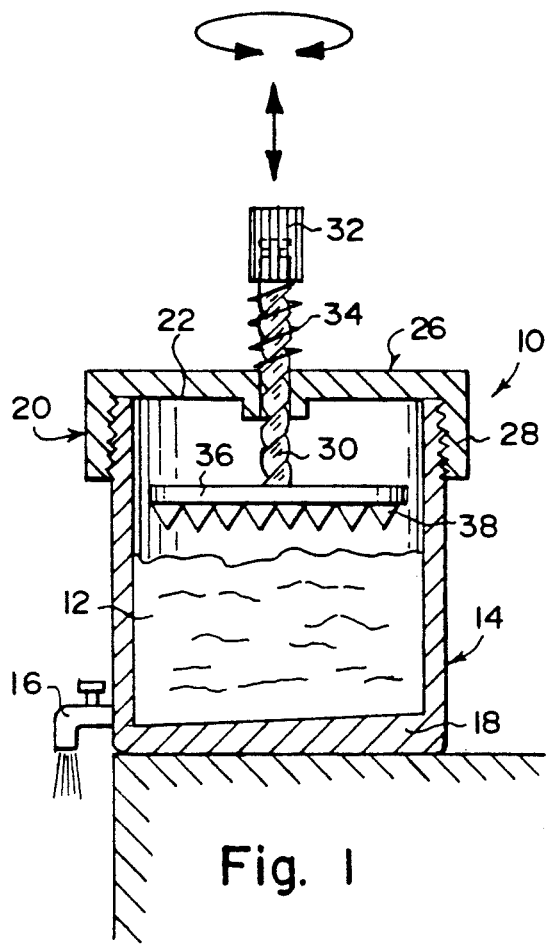
FIG. 1 is a cross sectional view of an apparatus for preparing the ingredients of the instant invention.
Figure 2:
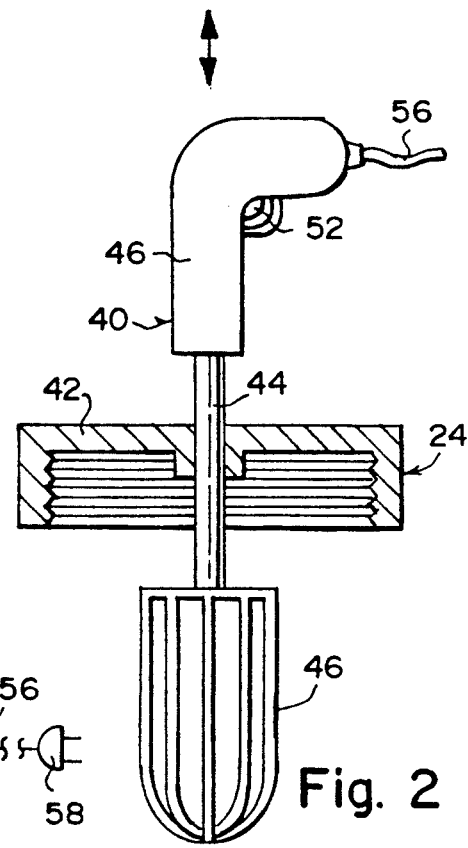
FIG. 2 is an electrical mixing mechanism that can be attached to the pot for mixing the ingredients therein.

Turning now descriptively to the drawings, in which similar reference characters denote similar elements throughout the several views, FIG. 1 illustrates an apparatus 10 for preparing a bunky-shake 12, which consists of a pot 14 for boiling the pulp of seven green plantains therein. A faucet 16 is fluidly connected to the side of the pot 14 approximate the bottom 18 thereof for draining off the water used in boiling the pulp of the seven green plantains. The faucet is adapted to drain only the fluid resulting from boiling the pulp by either dimensioning the faucet valve suitably or using a conventional suitable filter which is not the subject of this invention. A mechanism 20 is removably connected to the top 22 of the pot 14, for crushing the boiled pulp of the seven green plantains with the pulp of one yellow banana into the smooth substance. A mechanism 24, shown in FIG. 2, is also removably connected to the top 22 of the pot 14, for mixing one quart of skim milk, a half cup of corn syrup, a quarter cup of sugar, a teaspoon of butter, a half teaspoon of nutmeg, a half teaspoon of cinnamon and a dash of salt into the smooth substance.

The crushing mechanism 20 is a manually operated crusher mechanism 26, which includes a cover 28 that threadably fits onto and over the top 22 of the pot 14. A spiraled shaft 30 extends through the cover 20, while an enlarged knurled head 32, rotatably fit on the top end of the spiraled shaft 30. A compression spring 34 on the spiraled shaft 30 is located between the enlarged knurled head 32 and the cover 28. A disk 36 is mounted transversely at its center to the bottom end of the spiraled shaft 30. The disk 36 has a plurality of teeth 38 formed on its lower surface. When a person presses down on the enlarged knurled head 32, the spiraled shaft 30 will rotate and drive the disk 36 downwardly to crush the boiled pulp of the seven green plantains with the pulp of the one yellow banana within the pot 14 into the smooth substance.

Figure 3:
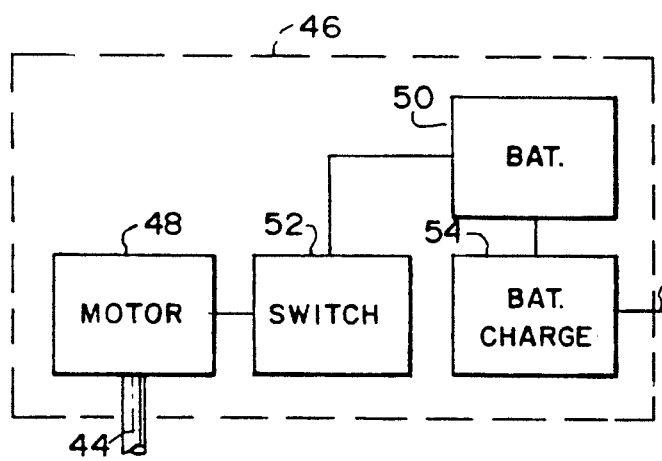
FIG. 3 is a block diagram of the electrical components within the electrical mixing mechanism shown in FIG. 2.

The mixing mechanism 24 is an electrical mixing mechanism 40, which includes a cover 42 that threadably fits onto and over the top 22 of the pot 14. a shaft 44 slides through the cover 42. A whisk 46 is mounted to the bottom end of the shaft 44. As shown in FIGS. 2 and 3, an electric hand held mixer 46 has a motor 48 therein connected to the shaft 44. A battery 50 is built into the electric hand held mixer 46 and is electrically connected to the motor 48. A switch 52 is built into the electric hand held mixer 46 and is electrically connected between the electric motor 48 and the battery 50. A battery charger 54 is built into the electric hand held mixer 46 and is electrically connected to the battery 50. An elongated electric cord 56 has a plug 58 at its distal end. The electric cord 56 is electrically connected to the battery charger 54 and extends from the electric hand held mixer 46. When the plug 58 is in engagement with an electrical socket, the battery charger 54 can charge the battery 50 to run the electric motor 48. When the switch 52 is turned on this causes the shaft 44 to rotate the whisk 46 to mix all the ingredients of the bunky-shake 12 within the pot 14.

To make the bunky-shake the following steps should be taken:

1. Remove the peel from the seven green plantains.
2. Boil the pulp of the seven green plantains for approximately twenty five minutes.
3. Remove the peel from the one yellow banana.
4. Crush the boiled pulp of the seven green plantains with the pulp of the one yellow banana into a smooth substance.
5. Mix the one quart of skim milk, the half cup of corn syrup, the quarter cup of sugar, the teaspoon of butter, the half teaspoon of nutmeg, the half teaspoon of cinnamon and the dash of salt into the smooth substance.

| NUTRITIONAL ANALYSIS OF THE BUNKY-SHAKE | |
| --- | --- |
| Fat | 0.24% |
| Protein (Nx6.38) | 2.43% |
| Moisture | 27.20% |
| Ash | 0.69% |
| Carbohydrates (by difference) | 69.44% |
| Vitamin A | 193 IU/100 g |
| Vitamin C | 0.5 mg/100 g |
| Thiamine | 0.07 mg/100 g |
| Riboflavin | 0.13 mg/100 g |
| Niacin | 0.08 mg/100 g |

-continued

| NUTRITIONAL ANALYSIS OF THE BUNKY-SHAKE | |
|---|---|
| Sodium | 45 mg/100 g |
| Calcium | 114 mg/100 g |
| Iron | 0.13 mg/100 g |
| Calories: | 290 per 100 g |

| NUTRITIONAL INFORMATION PER SERVING OF THE BUNKY-SHAKE | |
|---|---|
| Standard Nutritional Label Format (in the following order: | |
| Serving size: | 8 ounces |
| Calories | 660 |
| Protein | 6 g |
| Carbohydrates | 157 g |
| Fat | 1 g |
| Sodium | 100 mg |
| Percentage of U.S. Recommended Daily Allowance | |
| Protein | 10% |
| Vitamin A | 8% |
| Vitamin C | 2% |
| Thiamine (Vitamin B1) | 10% |
| Riboflavin (Vitamin B2) | 15% |
| Niacin | less than 2 |
| Calcium | 25% |
| Iron | 2% |

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. An apparatus for preparing a shake comprising:
   a) a pot in which pulp may be boiled; said pot having external threads on a top portion thereof;
   b) a faucet fluidly connected to the side of said pot approximate a bottom portion thereof for draining off boiled pulp fluid;
   c) means removably connected to the top of said pot for crushing and rotating the boiled pulp into a smooth substance; wherein said means is a manually operated rotating crusher mechanism which includes:
   d) a cover that threadably fits onto and over the top of said pot;
   e) a spiraled shaft that extends through said cover;
   f) an enlarged knurled head that is rotatable and fits on the top end of said spiraled shaft;
   g) a compression spring on said spiraled shaft located between said enlarged knurled head and said cover; and
   h) a disk mounted transversely at its center to the bottom end of said spiraled shaft, said disk having a plurality of teeth formed on its lower surface, so that when a person presses down on said enlarged knurled head, said spiraled shaft will move down and will rotate to mix and drive said disk rotatably downwardly to crush and mix the boiled pulp into the smooth substance.

2. An apparatus for preparing a shake comprising a pot with a faucet for draining boiled pulp third in combination with:
   a) a cover that threadably fits onto and over the top of said pot;
   b) a shaft that slides axially through and rotates in said cover;
   c) a which mounted to the bottom end of said shaft;
   d) an electric hand held mixer having a motor therein connected to the top end of said shaft;
   e) a battery built into said electric hand held mixer and electrically connected to said motor;
   f) a switch built into said electric hand held mixer and electrically connected between said electric motor and said battery;
   g) a battery charger built into said electric hand held mixer and electrically connected to said battery; and
   h) an elongated electric cord having a plug at its distal end, said electric cord electrically connected to said battery charger and extends from said electric hand held mixer, so that when said plug is in engagement with an electrical socket said battery charger can charge said battery to run said electric motor when said switch is turned on, causing said shaft to rotate said whisk to mix all the ingredients of said shake within said pot.

* * * * *